United States Patent
Sato

(10) Patent No.: US 8,908,702 B2
(45) Date of Patent: Dec. 9, 2014

(54) INFORMATION PROCESSING APPARATUS, COMMUNICATION APPARATUS, INFORMATION PROCESSING METHOD, AND RELAY PROCESSING METHOD

(75) Inventor: Masahiro Sato, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 300 days.

(21) Appl. No.: 13/611,171

(22) Filed: Sep. 12, 2012

(65) Prior Publication Data

US 2013/0070776 A1 Mar. 21, 2013

(30) Foreign Application Priority Data

Sep. 20, 2011 (JP) ................. 2011-204940

(51) Int. Cl.
*H04L 12/28* (2006.01)
*H04L 12/24* (2006.01)
*H04L 12/713* (2013.01)
*G06F 9/455* (2006.01)

(52) U.S. Cl.
CPC .......... *H04L 41/0668* (2013.01); *H04L 45/586* (2013.01); *G06F 2009/45595* (2013.01)
USPC ........................................ 370/401

(58) Field of Classification Search
CPC .............. H04L 41/0668; H04L 45/586; G06F 2009/45595
USPC ........................................ 370/401
See application file for complete search history.

(56) References Cited

U.S. PATENT DOCUMENTS

2008/0181241 A1* 7/2008 Regan et al. ................. 370/401
2013/0219078 A1* 8/2013 Padmanabhan et al. ...... 709/238

FOREIGN PATENT DOCUMENTS

JP 2008-118577 5/2008

* cited by examiner

*Primary Examiner* — Melvin Marcelo
(74) *Attorney, Agent, or Firm* — Fujitsu Patent Center

(57) ABSTRACT

A disclosed method includes: receiving a packet from a first router of plural routers; identifying a communication type allocated to the first router by using first data representing a communication type for each of the plural routers; and requesting a communication apparatus nearest to the first router among plural communication apparatuses, for which a setting for a tunnel to transfer a packet to each of the plural routers is made and which are subordinate to the plural routers, to output a packet relating to the identified communication type to a tunnel to transfer a packet to the first router.

15 Claims, 20 Drawing Sheets

| GATEWAY | NEAREST ROUTER | TUNNEL | VRRP GROUP |
|---|---|---|---|
| 31 | 1.1.1.1 | 61/63 | 1/2 |
| 32 | 1.1.1.2 | 64/62 | 2/1 |

FIG.6

| GATEWAY | NEAREST ROUTER | TUNNEL | VRRP GROUP |
|---|---|---|---|
| 33 | 2.2.2.1 | 61/62 | 3/4 |
| 34 | 2.2.2.2 | 64/63 | 4/3 |

FIG.7

| FLOW IDENTIFIER | VRRP GROUP |
|---|---|
| 1 | 1 |
| 2 | 2 |

FIG.8

| FLOW IDENTIFIER | VRRP GROUP |
|---|---|
| 1 | 3 |
| 2 | 4 |

FIG.9

| VRRP GROUP | ACT |
|---|---|
| 1 | 1.1.1.1 |
| 2 | |

FIG.11

| VRRP GROUP | ACT |
|---|---|
| 1 | 1.1.1.1 |
| 2 | 1.1.1.2 |

FIG.12

| VRRP GROUP | ACT |
|---|---|
| 3 | 2.2.2.1 |
| 4 | 2.2.2.2 |

FIG.13

| MAC ADDRESS | OUTPUT IF |
|---|---|
| A | P1 |
| — | — |

FIG.20

| MAC ADDRESS | OUTPUT IF |
|---|---|
| A | P2 |
| — | — |

FIG.21

| MAC ADDRESS | OUTPUT IF |
|---|---|
| A | TUNNEL 61 |
| — | — |

FIG.22

| MAC ADDRESS | OUTPUT IF |
|---|---|
| A | P3 |
| — | — |

FIG.23

| MAC ADDRESS | OUTPUT IF |
|---|---|
| A | TUNNEL 61 |
| C | P4 |

FIG.25

| MAC ADDRESS | OUTPUT IF |
|---|---|
| A | P1 |
| C | TUNNEL 61 |

FIG.26

| FLOW IDENTIFIER | OUTPUT IF |
|---|---|
| 1 | TUNNEL 62 |
| 2 | TUNNEL 64 |

FIG.28

| FLOW IDENTIFIER | OUTPUT IF |
|---|---|
| 1 | TUNNEL 62 |
| 2 | – |

FIG.30

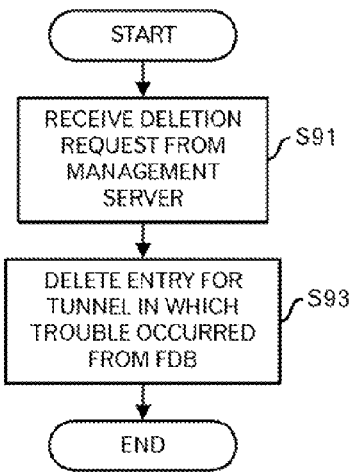
FIG.31
FIG.32
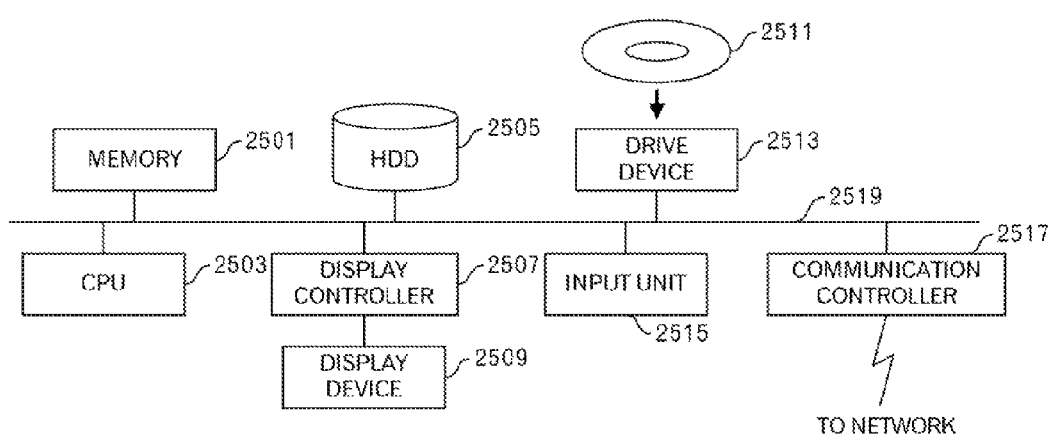
FIG.36

INFORMATION PROCESSING APPARATUS, COMMUNICATION APPARATUS, INFORMATION PROCESSING METHOD, AND RELAY PROCESSING METHOD

CROSS-REFERENCE TO RELATED APPLICATIONS

This application is based upon and claims the benefit of priority of the prior Japanese Patent Application No. 2011-204940, filed on Sep. 20, 2011, the entire contents of which are incorporated herein by reference.

FIELD

The embodiments discussed herein are directed to an information processing apparatus, a communication apparatus, an information processing method, and a relay processing method.

BACKGROUND

The placement of a virtual machine that is built in a cloud service may change by the live migration. When a situation occurs that a virtual machine moves by the live migration to a physical machine that is subordinate to a router different from a router before the movement, a tunneling technique (for example, L2T Pv3 (Layer 2 Tunneling Protocol Version 3) and GRE (Generic Routing Encapsulation)) for encapsulating packets is used for the communication between virtual machines. A detailed example is illustrated in FIG. 1. In the example in FIG. 1, virtual machine 2 moves by the live migration to a physical machine that is subordinate to a different router. A layer-2 relay apparatus (gateway in FIG. 1) is placed subordinate to a router, and this gateway carries out the tunneling. As a result, a tunnel is formed between the gateways, so the communication is made possible between the virtual machine 1 and the virtual machine 2.

Incidentally, in the cloud service, in order to increase the availability of the service, redundant apparatuses may be provided. First, Virtual Router Redundancy Protocol (VRRP) that can be applied to layer-3 apparatuses is known as a method for controlling the redundancy of the routers. In VRRP, the redundancy is controlled by assigning an ACT (Active) or STBY (Standby) state to the routers, where a router that is in the ACT state transfers packets, and a router that is in the STBY state waits without transferring packets. However, in VRRP, it is possible to prepare plural VRRP groups, so it is possible to set routers that are in the ACT state for each VRRP group. For example, it is possible to carry out such settings that in VRRP group 1, router 1 is set to be in the ACT state, and the other routers are set to be in the STBY state, and in VRRP group 2, router 2 is set to be in the ACT state, and the other routers are set to be in the STBY state. Therefore, it is possible to efficiently use the routers.

On the other hand, Extreme Standby Router Protocol (ESRP) that can be applied to layer-2 apparatuses is known as a method for controlling the redundancy of gateways such as described above (in other words, layer-2 relay apparatuses that carry out the tunneling). In ESRP as well, the redundancy is controlled by assigning the ACT state or STBY state to each gateway, however, unlike VRRP, it is not possible to carry out control using plural groups. More specifically, when the gateway 1 is set to be in the ACT state, for example, the gateway 1 can transfer packets, however, all the gateways other than the gateway 1 are set to in the STBY state and cannot transfer packets.

Therefore, when the layer-2 apparatuses are redundant in a cloud service, there is a problem in that it is only possible to use the tunnel set for some layer-2 apparatuses, and routes for transferring packets are limited. There is also a problem in that the load is concentrated in some layer-2 apparatuses.

Conventionally, as for the redundancy and tunneling, there are techniques as follows. More specifically, plural Local Area Networks (LANs) are integrated into one Virtual Private Network (VPN) through IP networks using the tunneling technique. The redundancy is controlled by assigning virtual IP addresses that correspond to the connection destination LAN to both ends of each tunnel, and by correlating a group of routers with both ends of each tunnel. However, in this technique, the problem concerning the method of controlling the redundancy of the layer-2 apparatuses such as described above is not considered.

Namely, there is no conventional technique for efficiently transferring packets in case where the communication apparatuses are redundant.

SUMMARY

An information processing apparatus relating to one aspect of this technique includes: (A) a memory; (B) a processor using the memory and configured to execute a procedure, the procedure including: (b1) receiving a packet from a first router of plural routers; (b2) first identifying a communication type allocated to the first router by using first data representing a communication type for each of the plural routers; (b3) requesting a communication apparatus nearest to the first router among plural communication apparatuses, for which a setting for a tunnel to transfer a packet to each of the plural routers is made and which are subordinate to the plural routers, to output a packet relating to the identified communication type to a tunnel to transfer a packet to the first router.

A communication apparatus relating to one aspect of this technique includes: (A) a first data storage unit storing a transmission source address of a packet in association with an identifier of an output destination port; (B) a second data storage unit storing an identifier of a communication type in association with an identifier of a port for which a tunnel to transfer a packet relating to the communication type is set; and (C) a processing unit configure to execute a procedure, the procedure comprising: (c1) determining whether or not a destination address included in a received packet is stored in the first data storage unit; (c2) upon determining that the destination address included in the received packet is not stored in the first data storage unit, determining whether or not an identifier of a port corresponding to a communication type of the received packet is stored in the second data storage unit; and (c3) upon determining that the identifier of the port corresponding to the communication type of the received packet is stored in the second data storage unit, outputting the received packet to the port corresponding to the communication type of the received packet.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 6 is a diagram illustrating an example of a gateway management table;

FIG. 7 is a diagram depicting an example of the gateway management table;

FIG. 8 is a diagram depicting an example of an allocation table;

FIG. 9 is a diagram depicting an example of the allocation table;

FIG. 11 is a diagram depicting an example of a VRRP management table;

FIG. 12 is a diagram depicting an example of the VRRP management table;

FIG. 13 is a diagram depicting an example of the VRRP management table;

FIG. 20 is a diagram depicting an example of data stored in FDB;

FIG. 21 is a diagram depicting an example of the data stored in the FDB;

FIG. 22 is a diagram depicting an example of the data stored in the FDB;

FIG. 23 is a diagram depicting an example of the data stored in the FDB;

FIG. 25 is a diagram depicting an example of data stored in the FDB;

FIG. 26 is a diagram depicting an example of data stored in the FDB;

FIG. 28 is a diagram depicting an example of a flow management table;

FIG. 30 is a diagram depicting an example of the flow management table;

FIG. 31 is a diagram depicting a processing flow of a processing carried out when the gateway received a deletion request;

FIG. 32 is a diagram depicting an example of the data stored in the FDB;

FIG. 36 is a functional block diagram of a computer.

DESCRIPTION OF EMBODIMENTS

Figure 1:
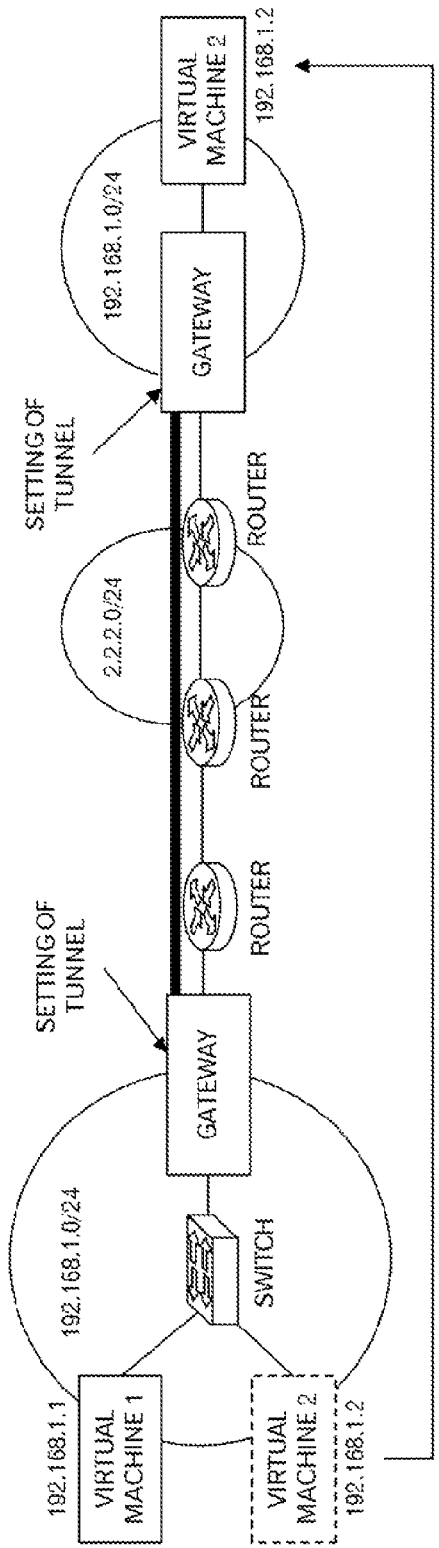
FIG. 1 is a diagram to explain the live migration.
Figure 2:
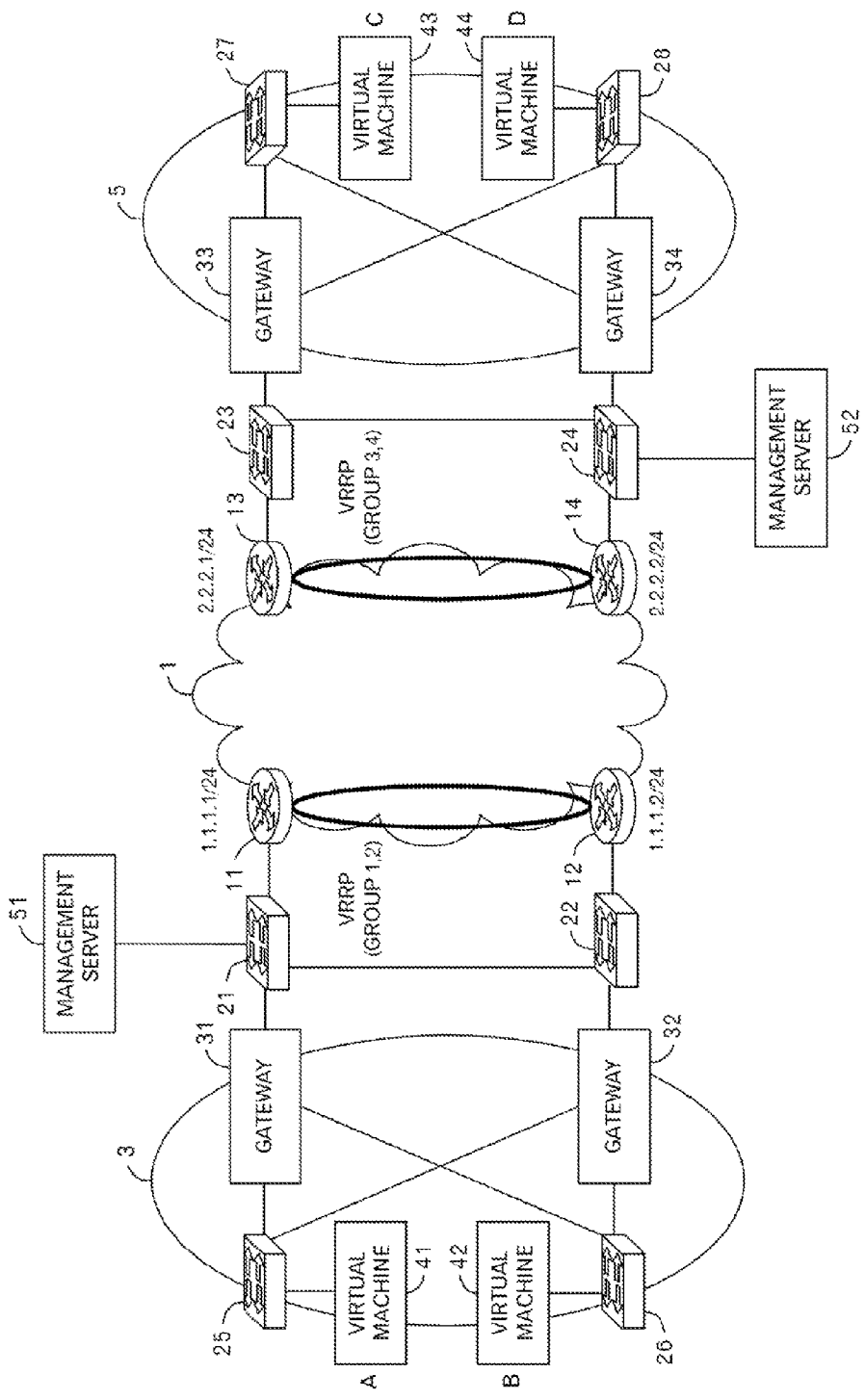
FIG. 2 is a system outline diagram relating to this embodiment.

FIG. 2 illustrates a system outline diagram relating to this embodiment. For example, routers 11 to 14 are connected to a network 1 such as the Internet. Here, the redundancy of the routers 11 and 12 is controlled by a first VRRP, and VRRP groups 1 and 2 are set for this first VRRP. The redundancy of the routers 13 and 14 is controlled by a second VRRP, and VRRP groups 3 and 4 are set for this second VRRP. The IP address of the router 11 is 1.1.1.1/24, the IP address of the router 12 is 1.1.1.2/24, the IP address of the router 13 is 2.2.2.1/24, and the IP address of the router 14 is 2.2.2.2/24, in this example.

A switch 21 is connected to the router 11, a switch 22 is connected to the router 12, a switch 23 is connected to the router 13 and a switch 24 is connected to the router 14. The switches 21 to 24 are layer-2 switches, for example.

A gateway 31 that is connected to a network 3, which is a LAN, for example, a management server 51 that manages the communication of the gateways 31 and 32, and the switch 22 are connected to the switch 21. The gateway 32 that is connected to the network 3 is connected to the switch 22. A gateway 33 that is connected to a network 5, which is a LAN, for example, and the switch 24 are connected to the switch 23. A gateway 34 that is connected to the network 5 and a management server 52 that manages the communication of the gateways 33 and 34 are connected to the switch 24.

The gateways 31 to 34 are communication apparatuses (for example, layer-2 relay apparatuses), and have a tunneling function. In other words, the gateways 31 to 34 have a function to set tunnels (hereafter, referred to as tunnels), and to carry out the communication with other apparatuses byway of the tunnels. A switch 25 and switch 26 are connected to the gateway 31. The switch 25 and switch 26 are also connected to the gateway 32. A switch 27 and switch 28 are connected to the gateway 33. The switch 27 and switch 28 are also connected to the gateway 34. The switches 25 to 28 are, for example, layer-2 switches.

A virtual machine 41 is connected to the switch 25. A virtual machine 42 is connected to the switch 26. A virtual machine 43 is connected to the switch 27. A virtual machine 44 is connected to the switch 28. The MAC address of the virtual machine 41 is A, the MAC address of the virtual machine 42 is B, the MAC address of the virtual machine 43 is C, and the MAC address of the virtual machine 44 is D, in this example.

Figure 3:
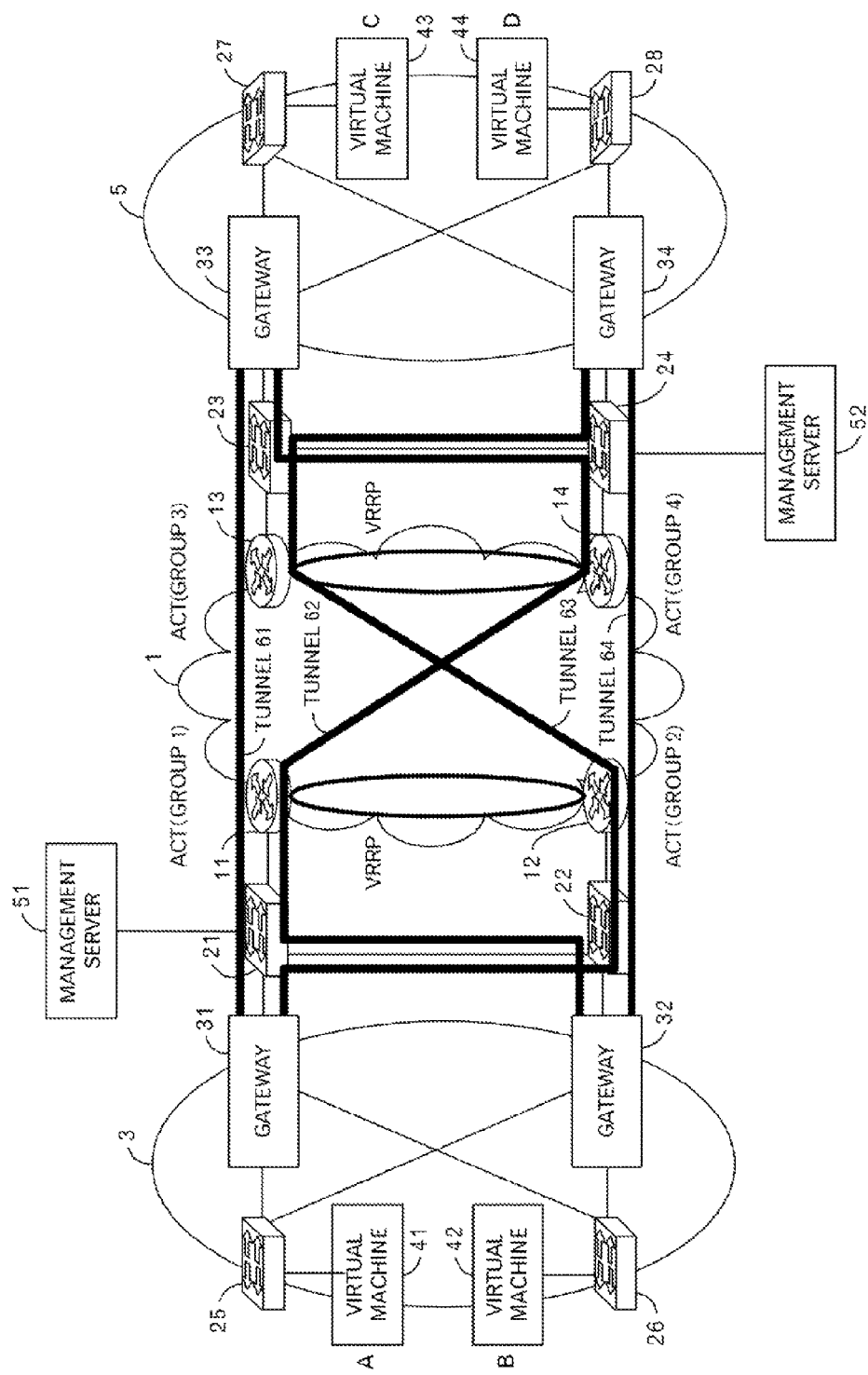
FIG. 3 is a diagram to explain settings of a tunnel.

In this embodiment, tunnels such as illustrated in FIG. 3 are set for the system illustrated in FIG. 2. In FIG. 3, a tunnel 61 is set between the gateway 31 and the gateway 33 via the switch 21, router 11, router 13 and switch 23; a tunnel 62 is set between the gateway 32 and the gateway 33 via the switch 22, switch 21, router 11, router 14, switch 24 and switch 23; a tunnel 63 is set between the gateway 31 and the gateway 34 via the switch 21, switch 22, router 12, router 13, switch 23 and switch 24; and a tunnel 64 is set between the gateway 32 and the gateway 34 via the switch 22, router 12, router 14 and switch 24.

Figure 4:
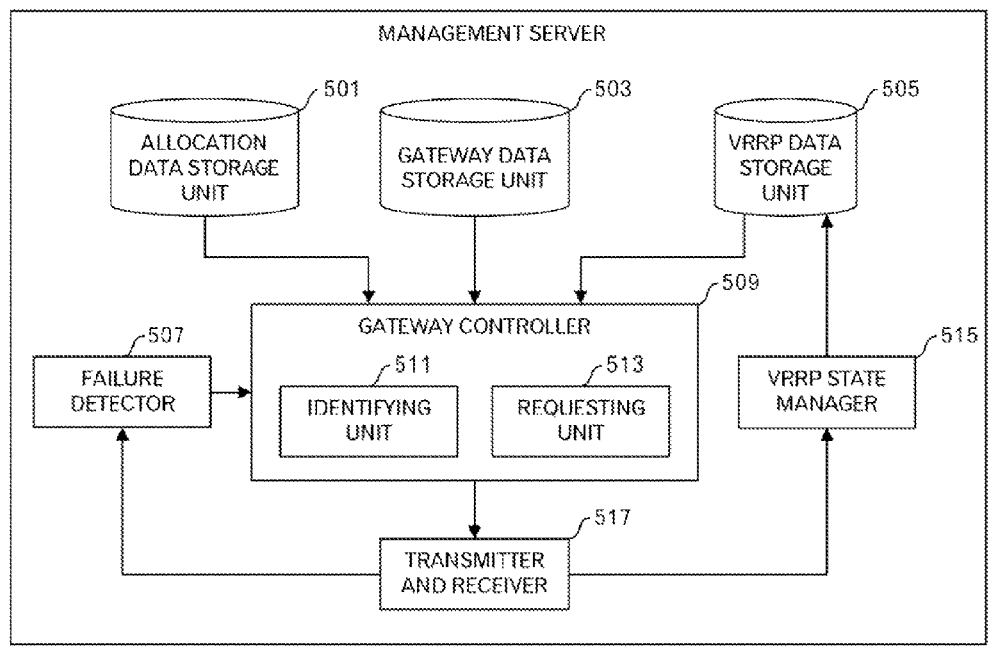
FIG. 4 is a functional block diagram of a management server.

FIG. 4 is a functional block diagram of the management servers 51 and 52. In the example in FIG. 4, the management servers 51 and 52 respectively include an allocation data storage unit 501, gateway data storage unit 503, VRRP data storage unit 505, failure detector 507, gateway controller 509 that includes an identifying unit 511 and requesting unit 513, VRRP state manager 515 and transmitter and receiver 517.

The transmitter and receiver 517 receives an advertise packet from a router (hereinafter, referred to as master router), which is in the ACT state in VRRP, and receives a packet (e.g. syslog packet) representing states of other apparatuses. Moreover, the transmitter and receiver 517 transmits a setting request for requesting a setting of a flow management table to a gateway. The failure detector 507 detects a trouble that occurred in a gateway or tunnel, based on the syslog packet. The identifying unit 511 uses data that is stored in the allocation data storage unit 501, the gateway data storage unit 503 and VRRP data storage unit 505 to carry out a processing for identifying the type of the communication of which a router is in charge (hereafter, called the flow). The requesting unit 513 uses data that is stored in the allocation data storage unit 501, the gateway data storage unit 503 and VRRP data storage unit 505 to carry out a processing for requesting a gateway to set the flow management table. The VRRP state manager 515 updates the data stored in the VRRP data storage unit 505, based on the advertise packet received from the master router.

Figure 5:
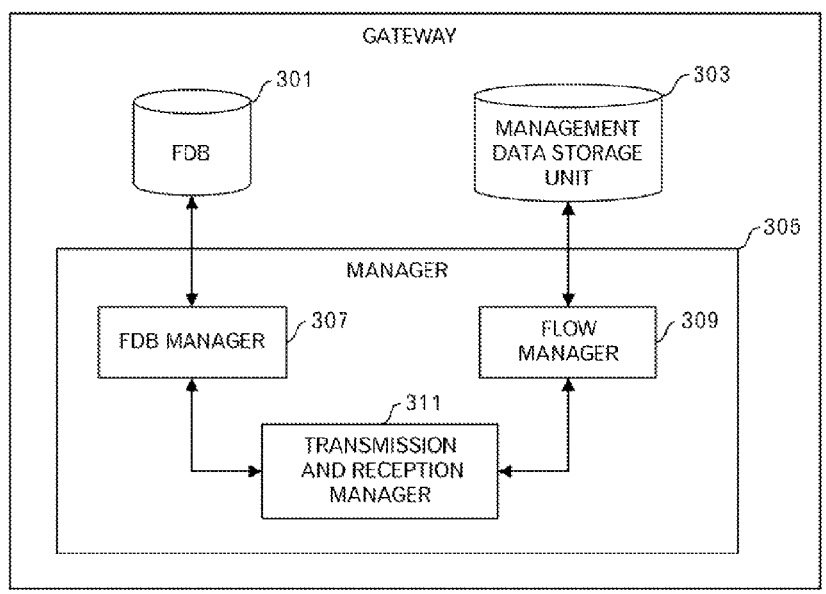
FIG. 5 is a functional block diagram of a gateway.

FIG. 5 illustrates a functional block diagram of the gateways 31 to 34. In the example in FIG. 5, the gateways 31 to 34 respectively includes a Forwarding DataBase (FDB) 301, management data storage unit 303, and manager 305 that includes a FDB manager 307, flow manager 309 and transmission and reception manager 311.

The transmission and reception manager 311 outputs received packets to the FDB manager 307 and flow manager 309, and carries out a processing to transmit packets, based on the processing results by the FDB manager 307 and flow manager 309. The FDB manager 307 carries out a processing based on data stored in the FDB 301, and outputs the processing results to the transmission and reception manager 311. The flow manager 309 carries out a processing based on the data stored in the management data storage unit 303, and outputs the processing results to the transmission and reception manager 311.

FIG. 6 illustrates an example of a gateway management table that is stored in the gateway data storage unit 503 of the management server 51. In the example in FIG. 6, an identifier for the gateway, an identifier for the nearest router, an identifier of the tunnel and an identifier of the VRRP group are stored. For example, data in the first line represents that the identifier of the nearest router to the gateway 31 is "1.1.1.1", the tunnels set for the gateway 31 are tunnels 61 and 63, the tunnel 61 is assigned to the VRRP group 1 and the tunnel 63 is assigned to the VRRP group 2. The nearest router is the router that is reachable through the shortest path from the gateway (for example, the router having the least number of hop counts).

FIG. 7 illustrates an example of the gateway management table stored in the gateway data storage unit 503 in the management server 52. The data format is the same as the data format as illustrated in FIG. 6.

FIG. 8 illustrates an example of an allocation table that is stored in the allocation data storage unit 501 in the management server 51. In the example in FIG. 8, an identifier of the flow and an identifier of the VRRP group are stored. In this embodiment, the identifier of the flow is a hash value that is calculated using the transmission source address and destination address, which are included in a packet.

FIG. 9 illustrates an example of an allocation table that is stored in the allocation data storage unit 501 in the management server 52. The data format is the same as the data format illustrated in FIG. 8.

The gateway management table and allocation table are set beforehand by an administrator or the like.

Next, the processing that is carried out by the system illustrated in FIG. 2 will be explained using FIG. 10 to FIG. 35. First, the processing that is carried out when the management server receives an advertise packet is explained.

Figure 10:
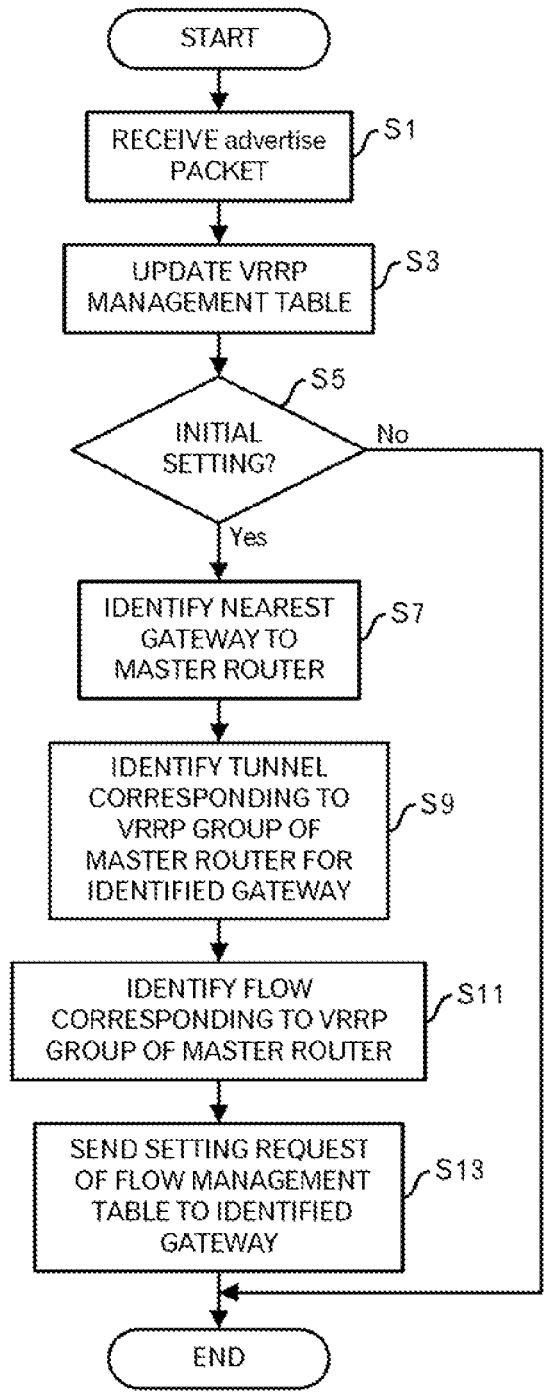
FIG. 10 is a diagram depicting a processing flow of a processing carried out when the management server received an advertise packet.

First, the transmitter and receiver 517 in the management server (here, the management server 51) receives the advertise packet including the identifier of the VRRP group from the router 11, and stores the advertise packet in a storage device such as a main memory (FIG. 10: step S1). Here, in this example, it is presumed that an advertise packet that includes the VRRP group identifier "1" is received. In the VRRP, the master router transmits an advertise packet, so in VRRP group 1, the router 11 is the master router.

The VRRP state manager 515 then updates the VRRP management table that is stored in the VRRP data storage unit 505 using the VRRP group identifier and the IP address of the router 11 that are included in the packet received at the step S1 (step S3).

FIG. 11 illustrates an example of a state of the VRRP management table at a stage when the step S3 is executed. In the example in FIG. 11, a VRRP group identifier and an identifier of the master router (IP address in the example in FIG. 11) are stored. For the VRRP group 2, the initial setting has not yet been carried out, so the master router identifier has not been registered, yet.

The requesting unit 513 of the gateway controller 509 then determines whether this processing is an initial setting processing (step S5). When the processing of the step S3 was carried out at the stage when the master router identifier has not been registered in the VRRP management table, it is determined that this processing is the initial setting processing.

When it is determined that the processing is not the initial setting processing (step S5: NO route), the flow management table of the gateway does not need to be updated, so the processing ends.

On the other hand, when it is determined that the processing is the initial setting processing (step S5: YES route), the requesting unit 513 identifies the nearest gateway 31 to the master router 11 of the VRRP group 1 from the gateway management table that is stored in the gateway data storage unit 503 (step S7). In this embodiment, the routers and gateways are arranged as illustrated in FIG. 2, so by identifying the gateway nearest router is the master router, it is possible to identify the gateway that is nearest to the master router.

The requesting unit 513 then identifies the tunnel that corresponds to the VRRP group whose master router is the router 11 (here, this is the VRRP group 1) for the gateway that was identified at the step S7 (here, this is the gateway 31) (step S9). At the step S9, the tunnel is identified using the data in the column of the tunnel and the column of the VRRP group in the gateway management table. As a result of the processing at the step S9, the tunnel 61 is identified.

Then, the identifying unit 511 identifies the flow that corresponds to the VRRP group of the master router (here, this is flow 1), from the allocation table stored in the allocation data storage unit 501 (step S11).

The requesting unit 513 then generates a setting request for setting the flow management table, which includes the identifier of the tunnel identified at the step S9 and the identifier of the flow identified at the step S11. The transmitter and receiver 517 transmits the generated setting request to the gateway that was identified at the step S7 (step S13). Then, the processing ends.

With the processing described above, after the initial setting is complete for any one of the routers 11 to 14, the VRRP management table is in a state as illustrated in FIG. 12 and FIG. 13. FIG. 12 is a diagram illustrating the VRRP management table for the management server 51, and FIG. 13 is a diagram illustrating the VRRP management table in the management server 52. As illustrated in FIG. 12 and FIG. 13, one of the routers 11 to 14 is set to be the master router in any one of the VRRP group.

Figures 14, 15, 16:
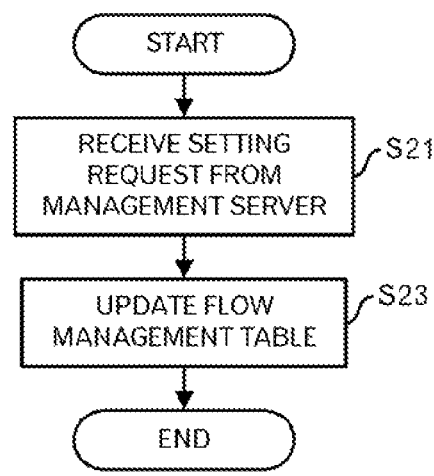
FIG. 14 is a diagram depicting a processing flow of a processing carried out when the gateway received a setting request.
FIG. 15 is a diagram depicting an example of a flow management table.
FIG. 16 is a diagram depicting an example of the flow management table.
Figure 17:
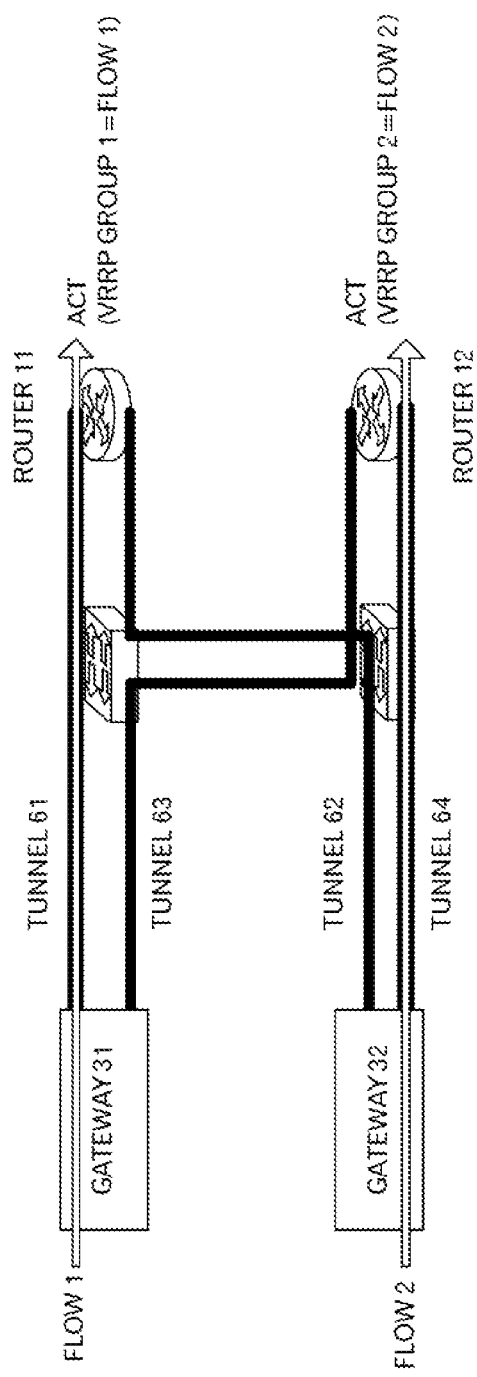
FIG. 17 is a diagram to explain a transfer route of a packet between the gateway and the router.

On the other hand, after the processing at the step S13, the gateway 31 executes a processing such as illustrated in FIG. 14. First, the transmission and reception manager 311 receives a setting request from the management server 51 via a specific port (FIG. 14: step S21), and outputs the setting request to the flow manager 309. The flow manager 309 then registers the tunnel identifier and the flow identifier that are included in the setting request in the flow management table that is stored in the management data storage unit 303 (step S23). The processing then ends.

By carrying out this kind of processing, the flow management table in a gateway is set along with the request from the management server.

After the initial setting is complete for all of the gateways 31 to 34, the flow management tables are in a state such as illustrated in FIG. 15 and FIG. 16. FIG. 15 is a drawing illustrating the flow management table in the gateways 31 and 33, and FIG. 16 is a drawing illustrating the flow management table in the gateways 32 and 34. In this way, the flow management tables are set so that packets related to the flow that is under the control of the nearest router are outputted through the tunnel having the shortest route to that router.

In the embodiment described above, as illustrated in FIG. 17, it is possible for a gateway that is subordinate to a router to transfer packets to any router using a tunnel, however, in the stage after the initial setting is finished, a tunnel is used for transferring packets to the nearest router. In other words, the control is carried out so that packets are efficiently outputted from tunnels that are capable of transferring packets according to the status data representing what flows each router is in charge of.

Moreover, when compared with the case of controlling the redundancy using ESRP or the like, it is possible to suitably use plural layer-2 apparatuses, so it is possible to prevent a load from becoming concentrated at a specific layer-2 apparatus, and it is possible to achieve the load distribution.

Next, a processing of transferring packets in a system in which the initial setting described above is complete will be explained using FIG. 18 to FIG. 27. First, a packet relay processing carried out by a gateway will be explained using FIG. 18.

Figure 18:
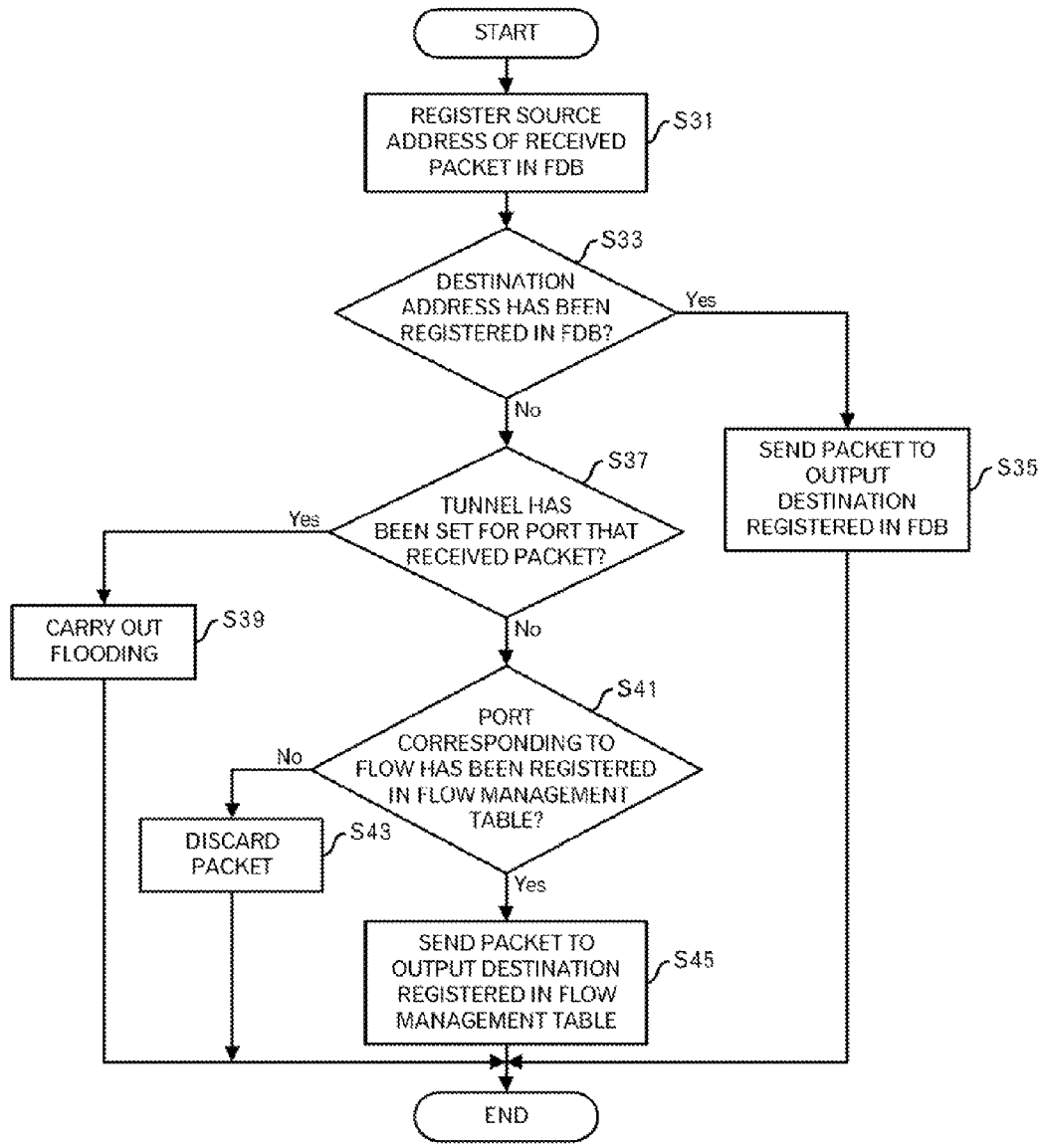
FIG. 18 is a diagram depicting a processing flow of a relay processing of the packet, which is carried out by the gateway.

First, after a packet is received, the transmission and reception manager 311 outputs the received packet to the FDB manager 307 and flow manager 309. The FDB manager 307 then correlates the transmission source address of the received packet with the identifier of the port (or tunnel identifier) that received that packet, and registers the result in the FDB 301 (FIG. 18: step S31).

The FDB manager 307 then determines whether or not the destination address of the received packet has been registered in the FDB 301 (step S33). When it is determined that the destination address of the received packet has been registered in the FDB 301 (step S33: YES route), the transmission and reception manager 311 causes the received packet to be transmitted to the output destination port that is associated with the FDB 301 with the destination address (step S35). In other words, the transmission and reception manager 311 carries out a unicast. The processing then ends.

On the other hand, when it is determined that the destination address is not registered in the FDB 301 (step S33: NO route), the transmission and reception manager 311 determines whether a tunnel is set for the port that received the packet (step S37). When it is determined that the tunnel is set (step S37: YES route), the transmission and reception manager 311 executes a flooding of the received packet (step S39). In other words, the transmission and reception manager 311 causes the received packet to be transmitted to ports other than the port that received the packet. The processing then ends.

However, when it is determined that a tunnel is not set for the port that received the packet (step S37: NO route), the flow manager 309 calculates the hash value (in other words, the flow identifier) using the transmission source address and destination address of the received packet. Then, the flow manager 309 determines whether the identifier of the output destination that corresponds to the calculated flow identifier is registered in the flow management table (step S41).

When it is determined that the output destination identifier that corresponds to the calculated flow identifier is not registered in the flow management table (step S41: NO route), the output destination is not clear, so the flow manager 309 discards the received packet (step S43). The processing then ends.

On the other hand, when it is determined that the output destination identifier that corresponds to the calculated flow identifier has been registered in the flow management table (step S41: YES route), the transmission and reception manager 311 causes the received packet to be transmitted to the registered output destination that is correlated with the calculated flow identifier (step S45). In other words, the unicast is carried out. The processing then ends.

By carrying out a processing such as described above, it becomes possible to output the packets to suitable tunnels according to the flow of received packets.

Next, a processing that is carried out by the apparatuses on the packet path until the packet actually arrives at the virtual machine that is the destination from a virtual machine of the transmission source will be explained in detail.

First, a case where the virtual machine 41 transmits a packet to the virtual machine 43 will be explained using FIG. 19 to FIG. 23.

Figure 19:
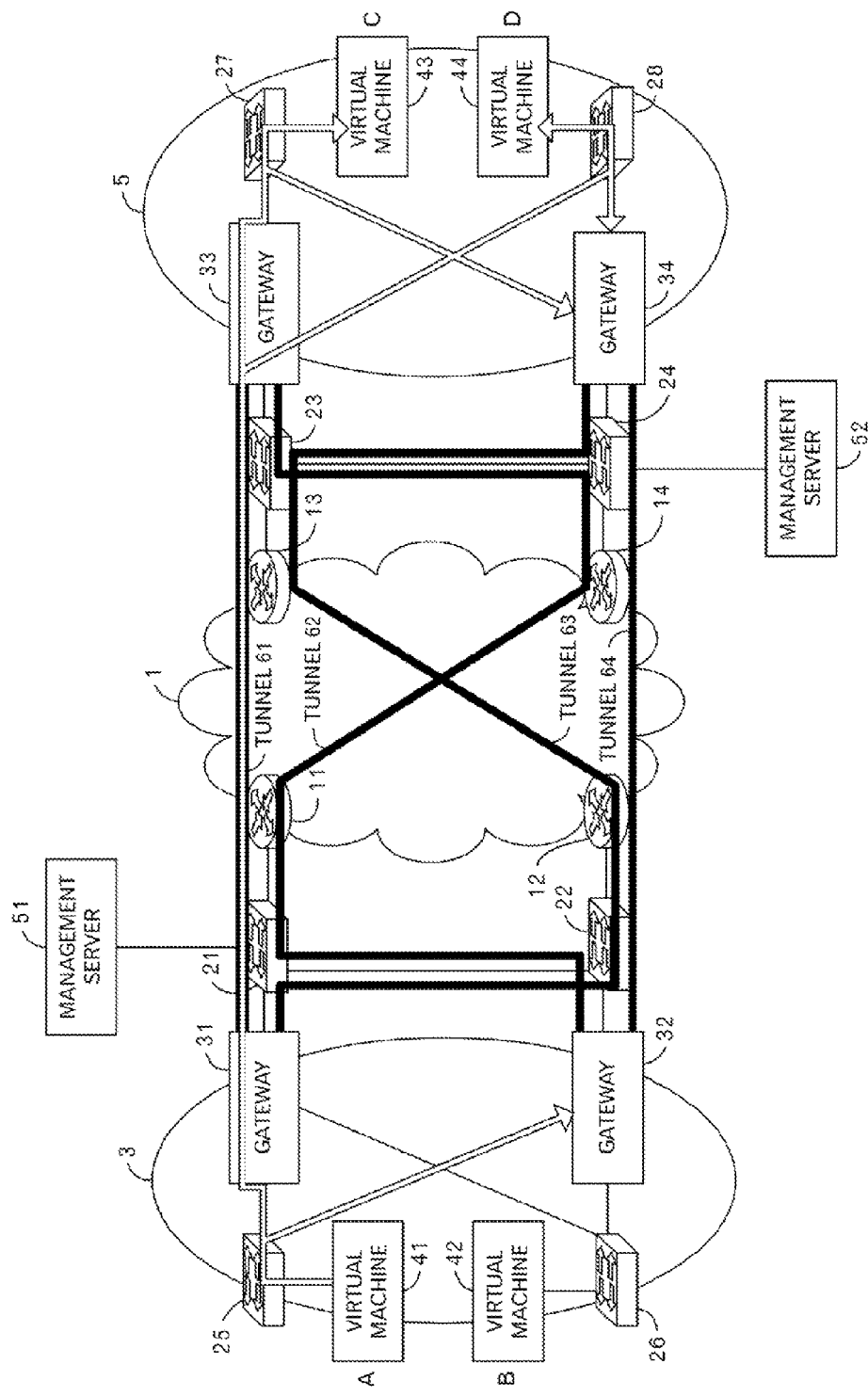
FIG. 19 is a diagram to explain communication between virtual machines.

In FIG. 19, the switch 25 receives the packet that was transmitted by the virtual machine 41. It is presumed that the hash value calculated for that packet is "1".

The destination MAC address (here, that address is MAC address C) is not registered in the FDB held by the switch 25, so the switch conducts the flooding. By this flooding, the gateways 31 and 32 receive the packet. The switch 25 also correlates the transmission source MAC address (here, that address is MAC address A) with the identifier of the receiving port, and registers the correlation in the FDB.

The destination MAC address is not registered in the FDB 301 held by the gateway 31, so the gateway 31 searches the flow management table. In the case of the flow management table illustrated in FIG. 15, the output destination of the packet is the tunnel 61, so the packet is outputted from the tunnel 61. The gateway 31 also correlates the MAC address of the transmission source with the identifier of the receiving port (here this is port P1), and registers the correlation in the FDB 301. With the processing up to this point, data such as illustrated in FIG. 20 is registered in the FDB 301 of the gateway 31.

The destination MAC address is not registered in the FDB 301 held by the gateway 32, so the gateway 32 searches the flow management table. When the flow management table is as illustrated in FIG. 16, the output destination of the packet is unclear, so the gateway 32 discards the packet. The gateway 32 also correlates the transmission source MAC address with the identifier of the receiving port (here this is port P2), and registers the correlation in the FDB 301. With the processing up to this point, data such as illustrated in FIG. 21 is registered in the FDB 301 of the gateway 32.

The packet that is transmitted by the gateway 31 reaches the gateway 33. The destination MAC address of the packet is not registered in the FDB 301 of the gateway 33. However, the packet is received from the tunnel 61, so the gateway 33 executes the flooding. With this flooding, the switch 27 and switch 28 receive the packet. The gateway 33 also correlates the transmission source MAC address with the tunnel identifier (here, this is tunnel 61), and registers the correlation in the FDB 301. With the processing up to this point, data such as illustrated in FIG. 22 is registered in the FDB 301 of the gateway 33.

The destination MAC address is not registered in the FDB held by the switch 27, so the switch 27 conducts the flooding. With this flooding, the gateway 34 and virtual machine 43 receive the packet. In this way, the virtual machine 43 receives the packet transmitted by the virtual machine 41. The switch 27 also correlates the transmission source MAC address with the identifier of the receiving port, and registers the correlation in the FDB.

The destination MAC address is not registered in the FDB held by the switch 28, so the switch 28 conducts the flooding. With this flooding, the gateway 34 and virtual machine 44 receive the packet. The switch 28 also correlates the transmission source MAC address with the identifier of the receiving port, and registers the correlation in the FDB.

The gateway 34 receives the packet from the switches 27 and 28. The destination MAC address is not registered in the FDB 301 held by the gateway 34, so the gateway 34 searches the flow management table. When the flow management table is as illustrated in FIG. 16, the output destination of the packet is unclear, so the gateway 34 discards the packet. The gateway 34 also correlates the transmission source MAC address with the identifier of the receiving port (here, this is port P3), and registers the correlation in the FDB 301. Here, the identifier of the receiving port that received the last packet of the packets received from the switches 27 and 28 is registered. With the processing up to this point, data such as illustrated in FIG. 23 is registered in the FDB 301 of the gateway 34.

On the other hand, a case that the virtual machine 43, which received a packet from the virtual machine 41, returns a packet to the virtual machine 41 will be explained using FIG. 24 to FIG. 26.

Figure 24:
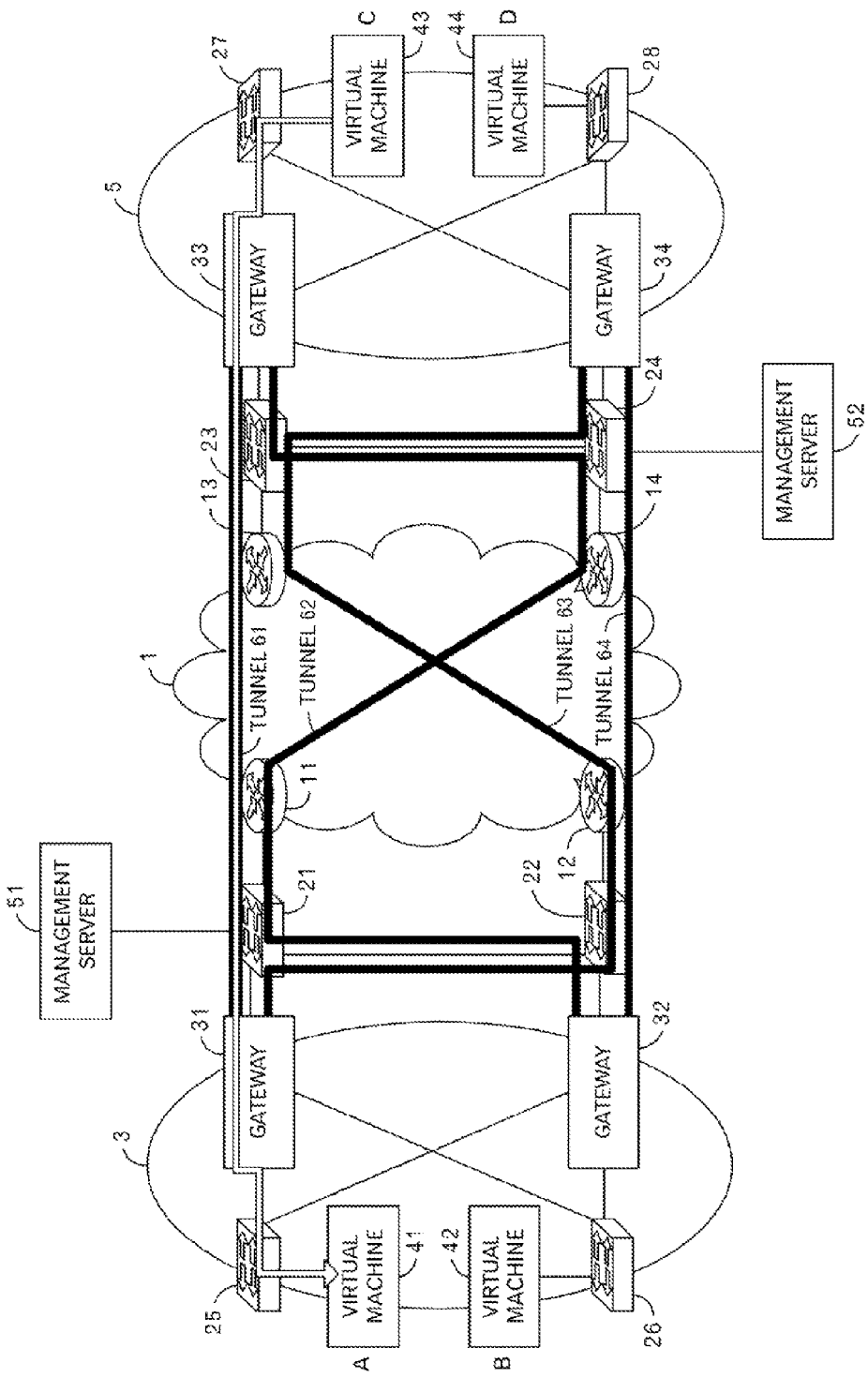
FIG. 24 is a diagram to explain the communication between the virtual machines.

In FIG. 24, the switch 27 receives the packet that was received by the virtual machine 43. The destination MAC address (here, this is MAC address A) has been registered in the FDB held by the switch 27, so the switch 27 outputs the packet from the port that corresponds to that destination MAC address. The gateway 33 receives the outputted packet.

The destination MAC address is registered in the FDB 301 held by the gateway 33, so the gateway 33 outputs the packet from the tunnel that corresponds to that destination MAC address (here, this is tunnel 61). The gateway 33 also correlates the transmission source MAC address (here, this is MAC address C) with the identifier of the receiving port (here, this is port P4), and registers the correlation result in the FDB 301. With the processing up to this point, data such as illustrated in FIG. 25 is registered in the FDB 301 of the gateway 33.

The packet that was transmitted by the gateway 33 arrives at the gateway 31. The destination MAC address is registered in the FDB 301 held by the gateway 31, so the gateway 31 outputs the packet from the port that corresponds to the destination MAC address (here, this is port P1). The gateway 31 also correlates the transmission source MAC address with the tunnel identifier (here, this is tunnel 61), and registers the correlation result in the FDB 301. With the processing up to this point, data such as illustrated in FIG. 26 is registered in the FDB 301 of the gateway 31. The switch 25 receives the packet that was transmitted by the gateway 31.

The destination address of the received packet has been registered in the FDB, so the switch 25 outputs the packet from the port corresponding to the destination address. As a result, the packet arrives at the virtual machine 41.

As described above, with the method of this embodiment, it becomes possible to suitably carry out the communication between the virtual machines that are subordinate to different routers.

Next, a processing that is carried out when any trouble or failure occurs in the network will be explained using FIG. 27 to FIG. 35. First, the processing that is carried out by the management server 51 when the trouble occurred in the gateway 31 will be explained.

Figure 27:
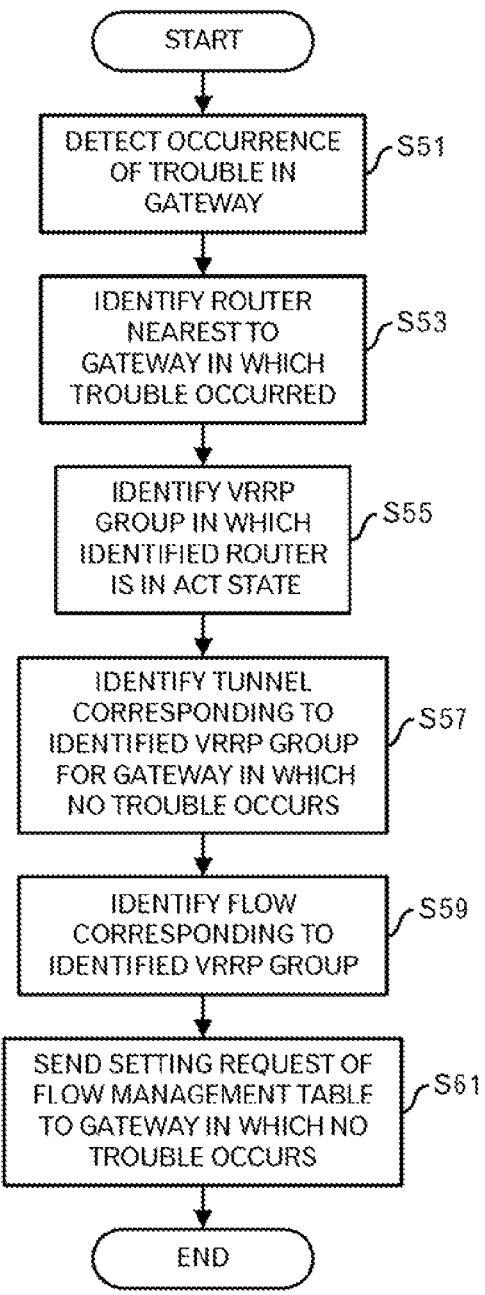
FIG. 27 is a diagram depicting a processing flow of a processing carried out when any trouble of the gateway was detected.

First, when the transmitter and receiver 517 of the management server 51 receives a syslog packet, the transmitter and receiver 517 outputs that packet to the failure detector 507. The failure detector 507 then detects whether any trouble occurred in a gateway (here, this is gateway 31) based on the syslog packet (FIG. 27: step S51).

Then, the requesting unit 513 identifies, from the gateway management table, the nearest router to the gateway where any trouble occurred (here, this is the router 11) (step S53).

The requesting unit 513 also identifies, from the VRRP management table, the VRRP group in which the router identified at the step S53 is in the ACT state (here, this is VRRP group 1) (step S55).

Then, as for the gateway where no trouble occurs (here this is the gateway 32), the requesting unit 513 identifies the tunnel that corresponds to the VRRP group that was identified at the step S55 (here, this is the tunnel 62) (step S57).

Then, the identifying unit 511 identifies, from the allocation table, the flow that corresponds to the VRRP group that was identified at the step S55 (here, this is the flow 1) (step S59).

Furthermore, the requesting unit 513 generates a setting request of the flow management table, which includes the identifier of the tunnel that was identified at the step S57 and the identifier of the flow that was identified at the step S59. Then, the transmitter and receiver 517 transmits the generated setting request to the gateway where no trouble occurred (step S61). The processing then ends.

On the other hand, after the processing of the step S61, the gateway 32 carries out the processing of the steps S21 and S23 (FIG. 14). The flow management table that is illustrated in FIG. 16 is changed as in FIG. 28. In other words, the gateway 32 becomes in charge of the flow 1 instead of the gateway 31 where the any trouble occurred, and transmits the packet relating to the flow 1 to the router 11 through the tunnel 62.

On the other hand, when the trouble occurred in the gateway 31, the management server 52 carries out a processing such as described below.

Figure 29:
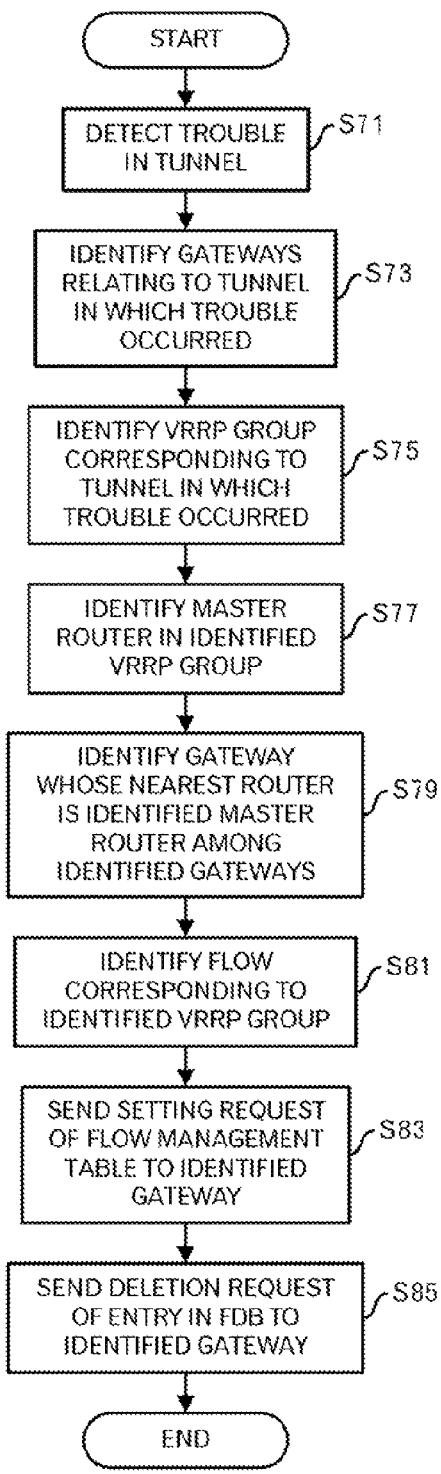
FIG. 29 is a diagram depicting a processing flow of a processing carried out when the trouble of the tunnel was detected.

First, when the transmitter and receiver 517 of the management server 52 receives the syslog packet, the transmitter and receiver 517 outputs that packet to the failure detector 507. The failure detector 507 then detects that a trouble or failure occurred in the tunnel (here, tunnels 61 and 63) based on the syslog packet (FIG. 29: step S71). The management server 52 cannot directly detect that the trouble occurred in the gateway 31, because the management server 52 is separated from the gateway 31 by the network 1. Therefore, the management server 52 detects that the trouble occurred in the gateway by the trouble that occurred in the tunnel.

The requesting unit 513 uses data in the column of the gateway and in the column of the tunnel in the gateway management table to identify the gateway(s) (here, gateways 33 and 34) related to the tunnel where any trouble occurred (step S73).

The requesting unit 513 then uses the data in the column of the tunnel and in the column of the VRRP group in the gateway management table to identify the VRRP group (here, this is VRRP group 3) that corresponds to the tunnel where any trouble occurred (step S75).

Then, the requesting unit 513 identifies, from the VRRP management table, the master router (here, this is router 13) of the VRRP group that was identified at the step S75 (step S77).

Then, the requesting unit 513 identifies, from the gateway management table, the gateway (here, this is gateway 33) whose nearest router is the master router from among the gateways identified at the step S73 (step S79).

The identifying unit 511 also identifies, from the allocation table, the flow (here, this is flow 1) that corresponds to the VRRP group that was identified at the step S75 (step S81).

Then, the requesting unit 513 generates a setting request for the flow management table, which includes the identifier of the tunnel (here, this is tunnel 62) in which no trouble occurred, among the tunnels set for the gateway identified at the step S79, and the identifier of the flow identified at the step S81. The transmitter and receiver 517 then transmits the generated setting request to the gateway that was identified at the step S79 (step S83).

The requesting unit 513 also generates a deletion request for requesting that an entry that includes the identifier of the tunnel (here, tunnel 61) where any trouble occurred is deleted from the FDB 301. The transmitter and receiver 517 then transmits the generated deletion request to the gateway that was identified at the step S79 (step S85). The processing then ends.

On the other hand, after the processing in step S83, the gateway 33 carries out a processing of the steps S21 and S23 (FIG. 14). As a result, the flow management table illustrated in FIG. 15 is changed as in FIG. 30. In other words, the gateway 33 transmits the packet relating to the flow 1 to the router 14 using the tunnel 62 instead of the tunnel 61 in which the trouble occurred.

Moreover, after the processing at the step S85, the gateway 33 executes a processing such as illustrated in FIG. 31. First, the transmission and reception manager 311 of the gateway 33 receives the deletion request from the management server 52 by way of a specific port (FIG. 31: step S91), and outputs the deletion request to the FDB manager 307. The FDB manager 307 then deletes the entry that includes the identifier of the tunnel included in the deletion request from the FDB 301 (step S93). With the processing up to this point, the FDB 301 illustrated in FIG. 25 is changed as in FIG. 32. The processing then ends.

Figure 33:
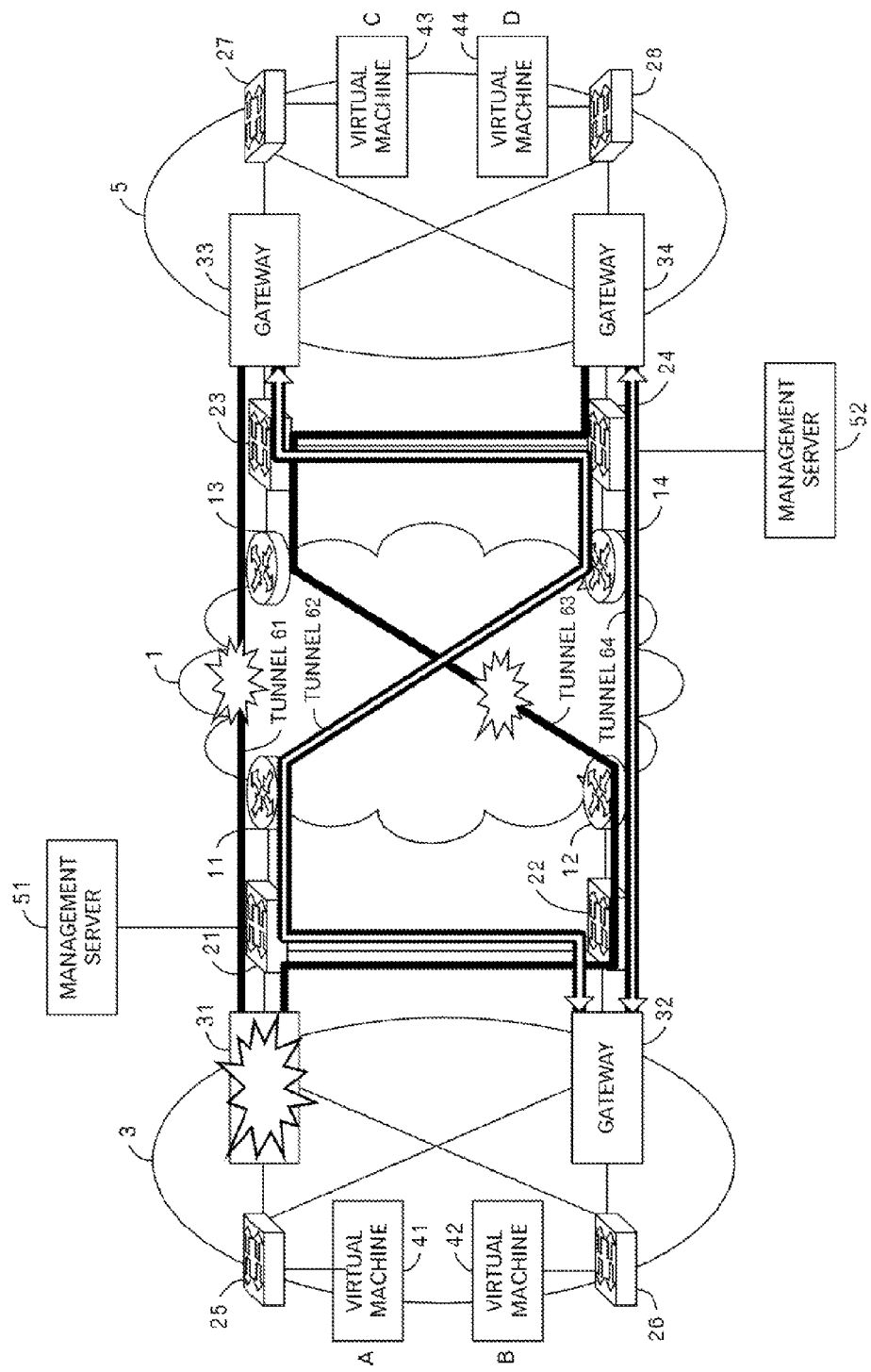
FIG. 33 is a diagram to explain a packet route when any trouble occurred in the gateway and tunnel.

By carrying out the processing such as described above, the gateway 33 is set as illustrated in FIG. 33 so that the tunnel 61 in which any trouble occurred is not used. Then, instead of the gateway 31, the gateway 32 uses the tunnel 62 to transfer the packets relating to the flow 1. As a result, it becomes possible to smoothly transfer packets without any delay.

Next, a processing that is carried out when the trouble occurs in a router will be explained using FIG. 34 and FIG. 35. When any trouble occurs in the router 11, for example, the router 11 is no longer able to transmit an advertise packet to the router 12 or the like. When the router 12 cannot receive the advertise packets from the router 11, the router 12 confirms that any trouble occurred in the router 11.

The router 12 transmits a message (for example, a Gratuitous Address Resolution Protocol (GARP) message) requesting that the setting be changed so that packets that are transmitted to the router 11 be transmitted to the router 12 to the gateways 31 and 32.

Figure 34:
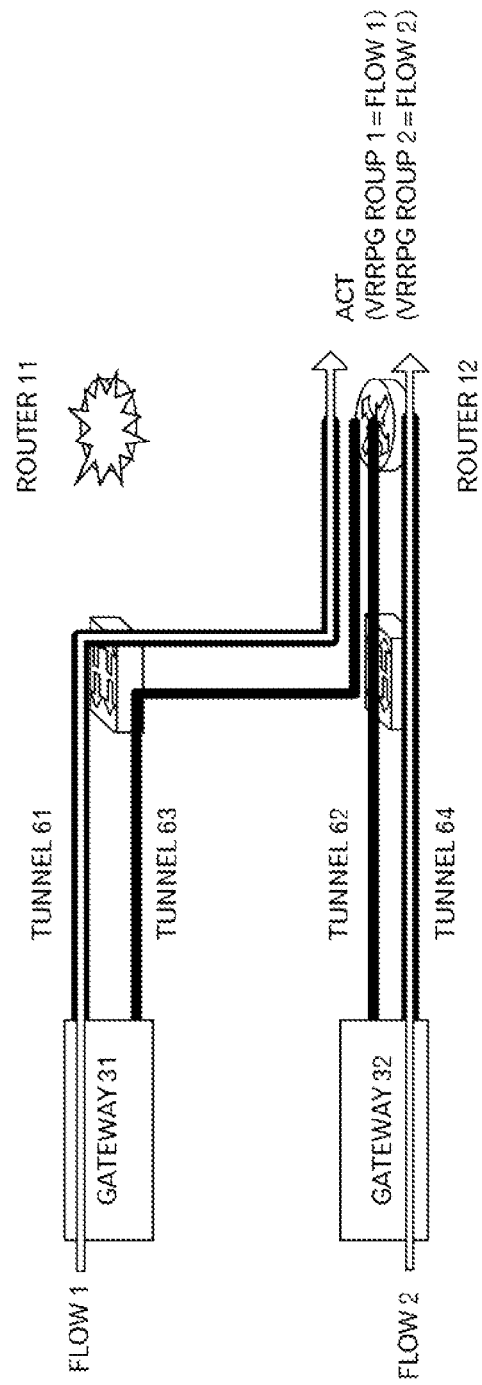
FIG. 34 is a diagram to explain settings of the tunnel when the trouble occurred in the router.

On the other hand, the gateways 31 and 32 then change the setting of the tunnels as illustrated in FIG. 34. That is, the setting is changed such that the tunnels 61 and 62 that pass through the router 11 pass through the router 12. As a result, the packets relating to the flow 1 pass through the router 12.

Figure 35:
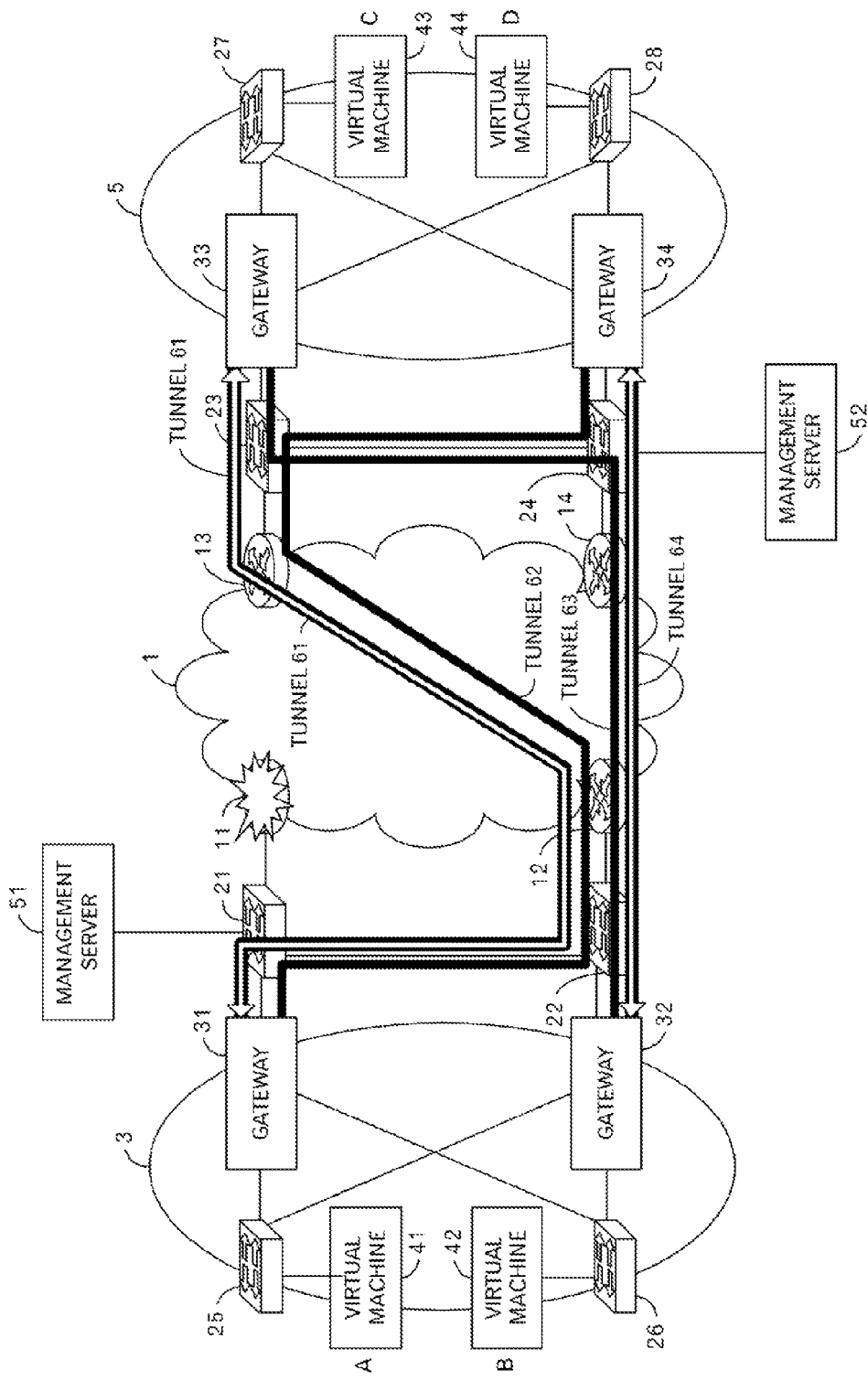
FIG. 35 is a diagram to explain settings of the tunnel when the trouble occurred in the router.

Moreover, after the setting has been changed in this way, the tunnels between the gateways become as illustrated in FIG. 35. The setting for the tunnel between gateways 31 and 32 is changed, however, the tunnel between the gateways 33 and 34 is not changed. By setting the tunnels in this way, it is possible to smoothly transfer packets without changing the settings for the flow management table and FDB in the gateways.

Although the embodiment of this technique was explained above, this technique is not limited to the embodiment. For example, the functional block diagrams of the aforementioned management server and gateways do not correspond to actual program module configurations.

Moreover, the structure of the respective table is a mere example, and the aforementioned structure is not always used. Furthermore, as for the processing flow, as long as the processing result does not change, the order of steps may be exchanged. Furthermore, the steps may be executed in parallel.

Furthermore, in the aforementioned example, the management server is provided separately from the gateways. However, the gateway and management server may be integrated. In such a case, one gateway of the plural gateways may have functions of the management server.

Moreover, in the aforementioned example, the number of gateways that the respective management server manages is "2". However, the number of gateways is not limited to "2". In such a case, the gateway utilized instead of the gateway in which any trouble occurred may be determined based on the priority degree or the like.

Moreover, in the aforementioned example, the nearest router for each gateway is managed in the management server. However, the nearest gateway may be managed for each router.

In addition, the aforementioned management servers 51 and 52 are computer devices as illustrated in FIG. 36. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as illustrated in FIG. 36. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

Incidentally, the respective processing units illustrated in FIG. 4 may be realized by a combination of the CPU 2503 in FIG. 36 and programs, in other words, the CPU 2503 executing the programs. Moreover, the respective data storage units illustrated in FIG. 4 may be realized as the memory 2501, HDD 2505 or the like in FIG. 36.

The embodiments described above are summarized as follows:

An information processing apparatus relating to this embodiment includes (A) an identifying unit, responsive to receiving a packet from a first router of plural routers, to first identify a communication type (e.g. flow in the embodiment) allocated to the first router by using first data representing a communication type for each of the plural routers; and (B) a requesting unit that requests a communication apparatus nearest to the first router among plural communication apparatuses, for which a setting for a tunnel to transfer a packet to each of the plural routers is made and which are subordinate to the plural routers, to output a packet relating to the identified communication type to a tunnel to transfer a packet to the first router.

With such a configuration, because plural layer-2 apparatuses are appropriately used according to the status data representing what layer-2 apparatuses the routers are in charge of, the packets are efficiently transferred.

Moreover, this information processing apparatus may further include a detector that detects an occurrence of a trouble in a network. Then, upon detecting, by the detector, an occurrence of a trouble in a first communication apparatus among the plural communication apparatuses, the aforementioned identifying unit may identifies, by using the first data, a communication type allocated to a router nearest to the first communication apparatus from among the plural routers. Moreover, the aforementioned requesting unit may requests either of communication apparatuses different from the first communication apparatus among the plural communication apparatuses to output a packet relating to the communication type identified by the identifying unit to a tunnel to transfer a packet to the router nearest to the first communication apparatus. Thus, by an alternate layer-2 apparatus instead of the layer-2 apparatus in which any trouble occurred, it is possible to transfer packets without any delay.

Moreover, upon detecting, by the detector, an occurrence of a trouble in a first tunnel, the aforementioned identifying unit may identify, by using the first data, a communication type allocated to a second router on the first tunnel from among the plural routers. Furthermore, the aforementioned requesting unit may requests a communication apparatus nearest to the second router among the plural communication apparatuses to output a packet relating to the communication type identified by the identifying unit to either of tunnels to transfer a packet to routers different from the second router among the plural routers, and not to transfer a packet to the second router. Thus, because it is possible to avoid the router on a tunnel in which any trouble occurred, it becomes possible to transfer packets without any delay.

Moreover, each of packets received from the first router may include an identifier of the first router and an identifier of a group to which the first router belongs, and the first data may include first management data to associate an identifier of a group with an identifier of a communication type allocated to the group and second management data to associate an identifier of a group with an identifier of a router that transfers a packet among routers belonging to the group. Then, the information processing apparatus relating to this embodiment may further include an update unit, responsive to receiving a packet from the first router, to update the second management data with an identifier of a group to which the first router belongs and an identifier of the first router. Moreover, upon receiving the packet from the first router, the aforementioned identifying unit may identify, by using the first management data, a communication type corresponding to the identifier of the group to which the first router belongs. With this configuration, even when the plural routers are controlled based on VRRP, for example, it is possible to appropriately identify the communication type of which the router is in charge.

Moreover, the information processing apparatus relating to this embodiment may further include: a data storage unit storing, for each of the plural communication apparatuses, an identifier of a router nearest to the communication apparatus. Then, the aforementioned identifying unit and the requesting unit may carry out a processing by using data stored in the data storage unit. By using such a data storage unit, it is possible to make a path from the layer-2 apparatus to the router the shortest path.

A layer-2 apparatus relating to this embodiment includes: (A) a first data storage unit storing a transmission source address of a packet in association with an identifier of an output destination port; (B) a second data storage unit storing an identifier of a communication type in association with an identifier of a port for which a tunnel to transfer a packet relating to the communication type is set; and (C) an instruction unit that executes a procedure including: determining whether or not a destination address included in a received packet is stored in the first data storage unit; upon determining that the destination address included in the received packet is not stored in the first data storage unit, determining whether or not an identifier of a port corresponding to a communication type of the received packet is stored in the second data storage unit; and upon determining that the identifier of the port corresponding to the communication type of the received packet is stored in the second data storage unit, outputting the received packet to the port corresponding to the communication type of the received packet. By carrying out such a processing, it is possible to output a received packet to an appropriate tunnel according to the communication type of the received packet.

Moreover, the aforementioned instruction unit may execute the procedure further including: upon determining that the destination address included in the received packet is not stored in the first data storage unit, determining whether or not a tunnel is set to a port that received the packet; upon determining that the tunnel is set to the port that received the packet, carrying out flooding of the packet; and upon determining that the destination address included in the received packet is not stored in the first data storage unit and the tunnel is not set to the port that received the packet, determining whether or not an identifier of the port corresponding to the communication type of the received packet is stored in the second data storage unit. When the tunnel has been set to the port that received the packet, it can be presumed that the packet received through an outside network. Then, by carrying out such a processing, it becomes possible to deliver packets to a destination apparatus that is subordinate to the layer-2 apparatus.

Moreover, the aforementioned instruction unit may execute the procedure further including upon determining that the identifier of the port corresponding to the communication type of the received packet is not stored in the second data storage unit, discarding the received packet. With this configuration, it becomes possible to cope with a case where the output destination is unknown.

Moreover, the aforementioned instruction unit may execute the procedure further including upon receiving a setting request including an identifier of a communication type and an identifier of a tunnel from an information processing apparatus that manages communication of the communication apparatus, storing the identifier of the tunnel, which is included in the setting request, in the second data storage unit in association with the identifier of the communication type. By carrying out such a processing, it is possible to carry out packet transfer according to the request from the information processing apparatus.

Moreover, the aforementioned instruction unit may execute the procedure further including: upon receiving a deletion request including an identifier of a tunnel from an information processing apparatus that manages communication of the communication apparatus, deleting an entry including the identifier of the tunnel, which is included in the received deletion request, from the first data storage unit. When the aforementioned processing is carried out, it is possible to prevent from outputting packets to the tunnel from which the packets are not to be outputted.

In addition, the identifier of the communication type may be a hash value calculated by using a transmission source address and a destination address of a packet. Incidentally, identification information of a communication protocol included in the packet, information on the priority or information on VLAN may be used.

An information processing method relating to this embodiment includes: receiving a packet from a first router of plurality routers; first identifying a communication type allocated to the first router by using first data representing a communication type for each of the plural routers; and requesting a communication apparatus nearest to the first router among plural communication apparatuses, for which a setting for a tunnel to transfer a packet to each of the plural routers is made and which are subordinate to the plural routers, to output a packet relating to the identified communication type to a tunnel to transfer a packet to the first router.

A relay processing method relating to this embodiment includes: determining whether or not a destination address included in a received packet is stored in a first data storage unit storing a transmission source address of a packet in association with an identifier of an output destination port; upon determining that the destination address included in the received packet is not stored in the first data storage unit, determining whether or not an identifier of a port corresponding to a communication type of the received packet is stored in a second data storage unit storing an identifier of a communication type in association with an identifier of a port for which a tunnel to transfer a packet relating to the communication type is set; and upon determining that the identifier of the port corresponding to the communication type of the received packet is stored in the second data storage unit, outputting the received packet to the port corresponding to the communication type of the received packet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information processing apparatus, comprising:
   a memory; and
   a processor using the memory and configured to execute a procedure, the procedure comprising:
     receiving a packet from a first router of a plurality of routers;
     first identifying a communication type allocated to the first router by using first data representing a communication type for each of the plurality of routers;
     requesting a communication apparatus nearest to the first router among a plurality of communication apparatuses, for which a setting for a tunnel to transfer a packet to each of the plurality of routers is made and which are subordinate to the plurality of routers, to output a packet relating to the identified communication type to a tunnel to transfer a packet to the first router.

2. The information processing apparatus as set forth in claim 1, wherein the procedure further comprises:
   detecting an occurrence of a trouble in a first communication apparatus among the plurality of communication apparatuses;
   second identifying, by using the first data, a communication type allocated to a router nearest to the first communication apparatus from among the plurality of routers;
   requesting either of communication apparatuses different from the first communication apparatus among the plurality of communication apparatuses to output a packet relating to the communication type identified at the second identifying to a tunnel to transfer a packet to the router nearest to the first communication apparatus.

3. The information processing apparatus as set forth in claim 2, wherein the procedure further comprises:
   detecting an occurrence of a trouble in a first tunnel;
   third identifying, by using the first data, a communication type allocated to a second router on the first tunnel from among the plurality of routers; and
   requesting a communication apparatus nearest to the second router among the plurality of communication apparatuses to output a packet relating to the communication type identified at the third identifying to either of tunnels to transfer a packet to routers different from the second router among the plurality of routers, and not to transfer a packet to the second router.

4. The information processing apparatus as set forth in claim 1, wherein each of packets received from the first router includes an identifier of the first router and an identifier of a group to which the first router belongs, and the first data includes first management data to associate an identifier of a group with an identifier of a communication type allocated to the group and second management data to associate an identifier of a group with an identifier of a router that transfers a packet among routers belonging to the group, and
   the procedure further comprises:
     upon receiving a packet from the first router, updating the second management data with an identifier of a group to which the first router belongs and an identifier of the first router, and the first identifying comprises:
upon receiving the packet from the first router, identifying, by using the first management data, a communication type corresponding to the identifier of the group to which the first router belongs.

5. The information processing apparatus as set forth in claim 1, further comprising:
a data storage unit storing, for each of the plurality of communication apparatuses, an identifier of a router nearest to the communication apparatus, and
wherein the first identifying and the requesting are executed using data stored in the data storage unit.

6. A communication apparatus, comprising:
a first data storage unit storing a transmission source address of a packet in association with an identifier of an output destination port;
a second data storage unit storing an identifier of a communication type in association with an identifier of a port for which a tunnel to transfer a packet relating to the communication type is set; and
a processing unit configure to execute a procedure, the procedure comprising:
determining whether or not a destination address included in a received packet is stored in the first data storage unit;
upon determining that the destination address included in the received packet is not stored in the first data storage unit, determining whether or not an identifier of a port corresponding to a communication type of the received packet is stored in the second data storage unit; and
upon determining that the identifier of the port corresponding to the communication type of the received packet is stored in the second data storage unit, outputting the received packet to the port corresponding to the communication type of the received packet.

7. The communication apparatus as set forth in claim 6, wherein the procedure further comprises:
upon determining that the destination address included in the received packet is not stored in the first data storage unit, determining whether or not a tunnel is set to a port that received the packet;
upon determining that the tunnel is set to the port that received the packet, carrying out flooding of the packet; and
upon determining that the destination address included in the received packet is not stored in the first data storage unit and the tunnel is not set to the port that received the packet, determining whether or not an identifier of the port corresponding to the communication type of the received packet is stored in the second data storage unit.

8. The communication apparatus as set forth in claim 6, wherein the procedure further comprises:
upon determining that the identifier of the port corresponding to the communication type of the received packet is not stored in the second data storage unit, discarding the received packet.

9. The communication apparatus as set forth in claim 6, wherein the procedure comprises:
upon receiving a setting request including an identifier of a communication type and an identifier of a tunnel from an information processing apparatus that manages communication of the communication apparatus, storing the identifier of the tunnel, which is included in the setting request, in the second data storage unit in association with the identifier of the communication type.

10. The communication apparatus as set forth in claim 6, wherein the procedure further comprises:

upon receiving a deletion request including an identifier of a tunnel from an information processing apparatus that manages communication of the communication apparatus, deleting an entry including the identifier of the tunnel, which is included in the received deletion request, from the first data storage unit.

11. The communication apparatus as set forth in claim 6, wherein the identifier of the communication type is a hash value calculated by using a transmission source address and a destination address of a packet.

12. An information processing method, comprising:
receiving, by using a computer, a packet from a first router of a plurality of routers;
first identifying, by using the computer, a communication type allocated to the first router by using first data representing a communication type for each of the plurality of routers; and
requesting, by using the computer, a communication apparatus nearest to the first router among a plurality of communication apparatuses, for which a setting for a tunnel to transfer a packet to each of the plurality of routers is made and which are subordinate to the plurality of routers, to output a packet relating to the identified communication type to a tunnel to transfer a packet to the first router.

13. A computer-readable, non-transitory storage medium storing a program for causing a computer to execute a procedure, the procedure comprising:
receiving a packet from a first router of a plurality of routers;
first identifying a communication type allocated to the first router by using first data representing a communication type for each of the plurality of routers;
requesting a communication apparatus nearest to the first router among a plurality of communication apparatuses, for which a setting for a tunnel to transfer a packet to each of the plurality of routers is made and which are subordinate to the plurality of routers, to output a packet relating to the identified communication type to a tunnel to transfer a packet to the first router.

14. A relay processing method, comprising:
determining, by using a communication apparatus, whether or not a destination address included in a received packet is stored in a first data storage unit storing a transmission source address of a packet in association with an identifier of an output destination port;
upon determining that the destination address included in the received packet is not stored in the first data storage unit, determining, by a communication apparatus, whether or not an identifier of a port corresponding to a communication type of the received packet is stored in a second data storage unit storing an identifier of a communication type in association with an identifier of a port for which a tunnel to transfer a packet relating to the communication type is set; and
upon determining that the identifier of the port corresponding to the communication type of the received packet is stored in the second data storage unit, outputting, by using the communication apparatus, the received packet to the port corresponding to the communication type of the received packet.

15. A computer-readable, non-transitory storage medium storing a program for causing a computer to execute a procedure, the procedure comprising:
determining whether or not a destination address included in a received packet is stored in a first data storage unit storing a transmission source address of a packet in association with an identifier of an output destination port;

upon determining that the destination address included in the received packet is not stored in the first data storage unit, determining whether or not an identifier of a port corresponding to a communication type of the received packet is stored in a second data storage unit storing an identifier of a communication type in association with an identifier of a port for which a tunnel to transfer a packet relating to the communication type is set; and upon determining that the identifier of the port corresponding to the communication type of the received packet is stored in the second data storage unit, outputting the received packet to the port corresponding to the communication type of the received packet.

* * * * *